(12) United States Patent
Flajnik et al.

(10) Patent No.: US 8,480,167 B2
(45) Date of Patent: Jul. 9, 2013

(54) INJECTION MOLDED ROCKER PANEL

(75) Inventors: Dave Flajnik, Rochester Hills, MI (US); Jamie Wells, Maidstone (CA)

(73) Assignee: Salflex Polymers Ltd., Ontario (CA)

(*) Notice: Subject to any disclaimer, the term of this patent is extended or adjusted under 35 U.S.C. 154(b) by 71 days.

(21) Appl. No.: 13/197,334

(22) Filed: Aug. 3, 2011

(65) Prior Publication Data
US 2013/0009425 A1    Jan. 10, 2013

Related U.S. Application Data

(60) Provisional application No. 61/505,346, filed on Jul. 7, 2011.

(51) Int. Cl.
*B60N 99/00*    (2006.01)

(52) U.S. Cl.
USPC .................................................. 296/209

(58) Field of Classification Search
USPC ............................................. 296/209, 193.05
See application file for complete search history.

(56) References Cited

U.S. PATENT DOCUMENTS

| | | | |
|---|---|---|---|
| 3,970,498 A * | 7/1976 | Loew | 156/211 |
| 4,277,526 A * | 7/1981 | Jackson | 428/31 |
| 4,298,640 A * | 11/1981 | Katoh | 428/31 |
| 4,546,022 A * | 10/1985 | Madonia et al. | 428/31 |
| 5,456,957 A | 10/1995 | Jackson et al. | |
| 6,171,543 B1 * | 1/2001 | Hirose | 264/572 |
| 6,214,266 B1 * | 4/2001 | Millif et al. | 264/129 |
| 6,742,835 B1 | 6/2004 | Floarea | |
| 7,464,986 B2 * | 12/2008 | Maki | 296/209 |
| 7,665,795 B2 | 2/2010 | Shishikura | |
| 7,784,856 B2 | 8/2010 | Fuchs et al. | |
| 7,846,533 B2 | 12/2010 | Zawacki et al. | |
| 7,896,397 B2 | 3/2011 | Rompage et al. | |
| 2007/0085361 A1 | 4/2007 | Hauser | |
| 2007/0296175 A1 | 12/2007 | Flajnik et al. | |
| 2011/0052899 A1 | 3/2011 | Mozer et al. | |
| 2011/0127797 A1 | 6/2011 | Garnett et al. | |

OTHER PUBLICATIONS

Written Opinion and International Search Report for related International Application No. PCT/CA2011/050650, report dated Feb. 28, 2012.

* cited by examiner

*Primary Examiner* — Lori Lyjak
(74) *Attorney, Agent, or Firm* — Miller, Matthias & Hull LLP

(57) ABSTRACT

A rocker panel assembly for attachment to a vehicle, comprising a rocker panel body, a first end feature situated on a first end of the rocker panel body, and a second end feature situated on a second end of the rocker panel body. The rocked panel body has an outside surface generally presented in the form of a convex surface, and an inside surface generally presented in the form of a concave surface. The outside surface of the rocker panel body extends outwardly of the vehicle, to present an outboard section having a predetermined profile based on targeted aesthetic/performance characteristics. The inside surface of the rocker panel body has at least one transverse rib positioned therein, the transverse rib being arranged generally perpendicular to the longitudinal axis of the rocker panel body.

16 Claims, 10 Drawing Sheets

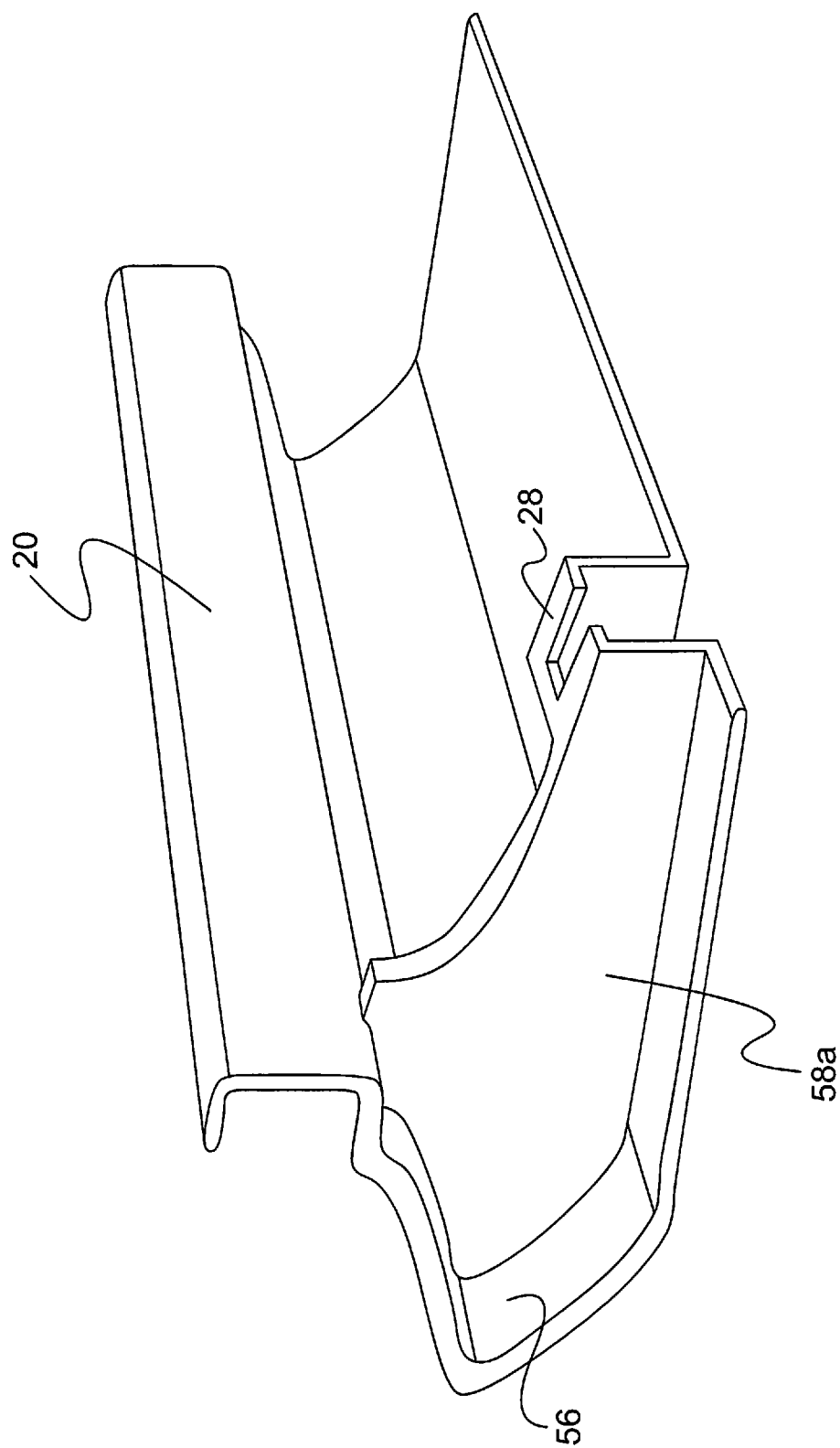

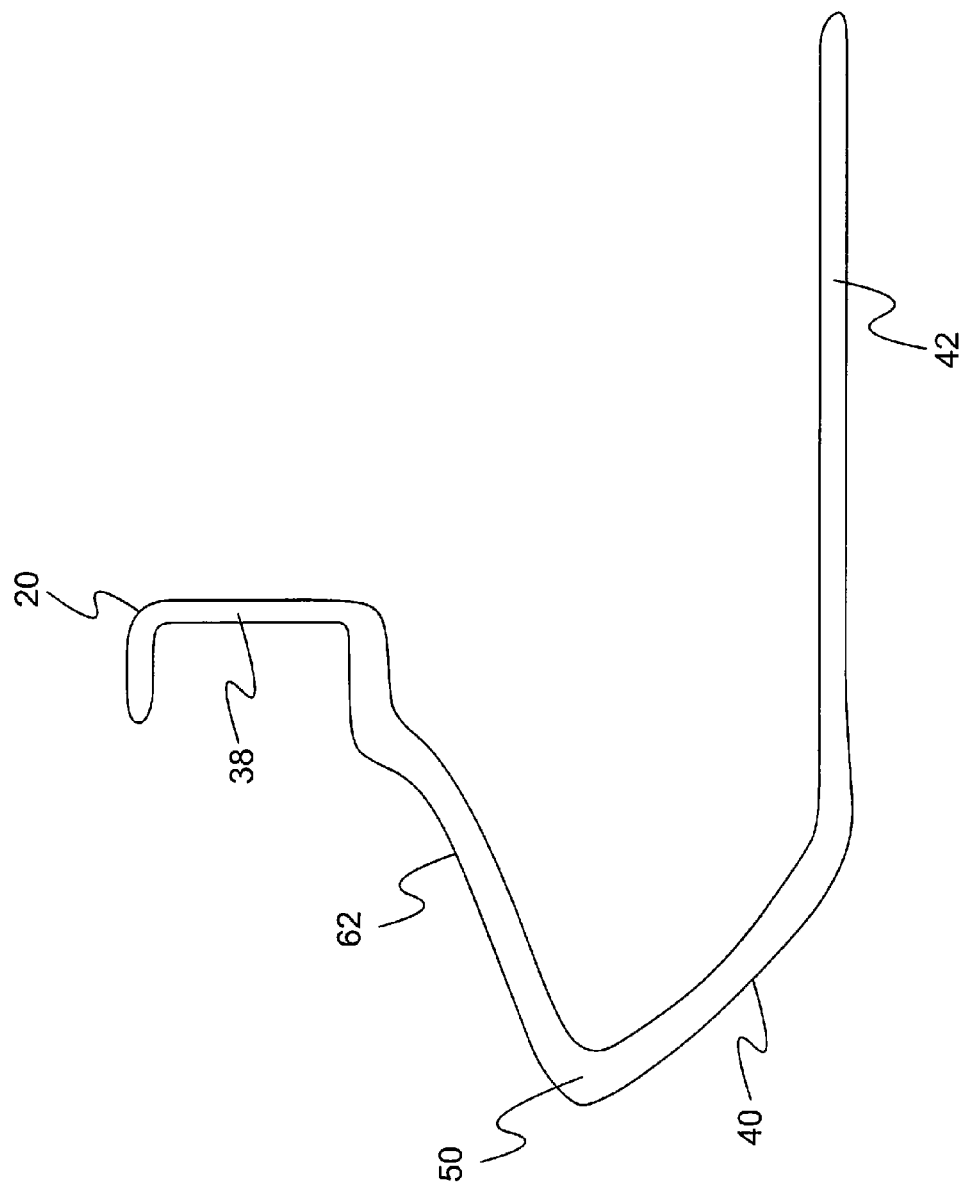

INJECTION MOLDED ROCKER PANEL

CROSS-REFERENCE TO RELATED APPLICATIONS

This is a non-provisional U.S. patent application, which claims priority under 35 U.S.C. §119(e) to U.S. Provisional Patent Application Ser. No. 61/505,346 filed on Jul. 7, 2011.

FIELD OF THE DISCLOSURE

The present disclosure relates to injection molded rocker panels, and in particular to an injection molded rocker panel with intermittent reinforcement ribs.

BACKGROUND OF THE DISCLOSURE

It is known in the automotive industry to provide vehicles with a body side-feature known as a rocker panel. The rocker panel is generally presented as the outer edge of the vehicle's underbody, and may serve as additional structural support to the vehicle.

As a portion of the rocker panel forms an exterior surface of the vehicle, aesthetics are considered in the rocker panel design. For example, in many instances, the rocker panel is formed with a Class "A" surface, and/or may be subject to additional finishing treatments such as chrome plating or painting.

More recently, improved vehicle performance, mainly in respect of ground effects and aerodynamics has prompted the introduction of new rocker panel designs, some of which now extend outwardly of the vehicle body, and which in some instances results in a larger overall configuration compared to flat panel designs of previous generations.

With the newer configurations, alternative construction methodologies are being considered, for example forming rocker panels from polymeric materials. As such, there exists a need for novel and improved constructions processes to product automotive products, for example rocker panels using alternative materials such as plastics.

SUMMARY OF THE DISCLOSURE

According to an embodiment of the present invention, provided is a rocker panel assembly for attachment to a vehicle. The rocker panel assembly comprises a rocker panel body, a first end feature situated on a first end of the rocker panel body, and a second end feature situated on a second end of the rocker panel body. The rocked panel body has an outside surface generally presented in the form of a convex surface, and an inside surface generally presented in the form of a concave surface. The outside surface of the rocker panel body extends outwardly of the vehicle, to present an outboard section having a predetermined profile based on targeted aesthetic/performance characteristics. The inside surface of the rocker panel body has at least one transverse rib positioned therein, the transverse rib being arranged generally perpendicular to the longitudinal axis of the rocker panel body.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 4a is a rear perspective view of a section of the rocker panel of FIG. 1, showing the incorporation of a full transverse rib.

FIG. 5 is a side sectional view of the rocker panel of FIG. 1, detailing the wall structure.

DETAILED DESCRIPTION OF THE PRESENT DISCLOSURE

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the formation/use of transverse ribs in rocker panels, the invention may also be used in other molding arrangements where it is deemed useful. Furthermore, there is no intention to be bound by any expressed or implied theory presented in the preceding technical field, background, brief summary or the following detailed description.

Figure 1:
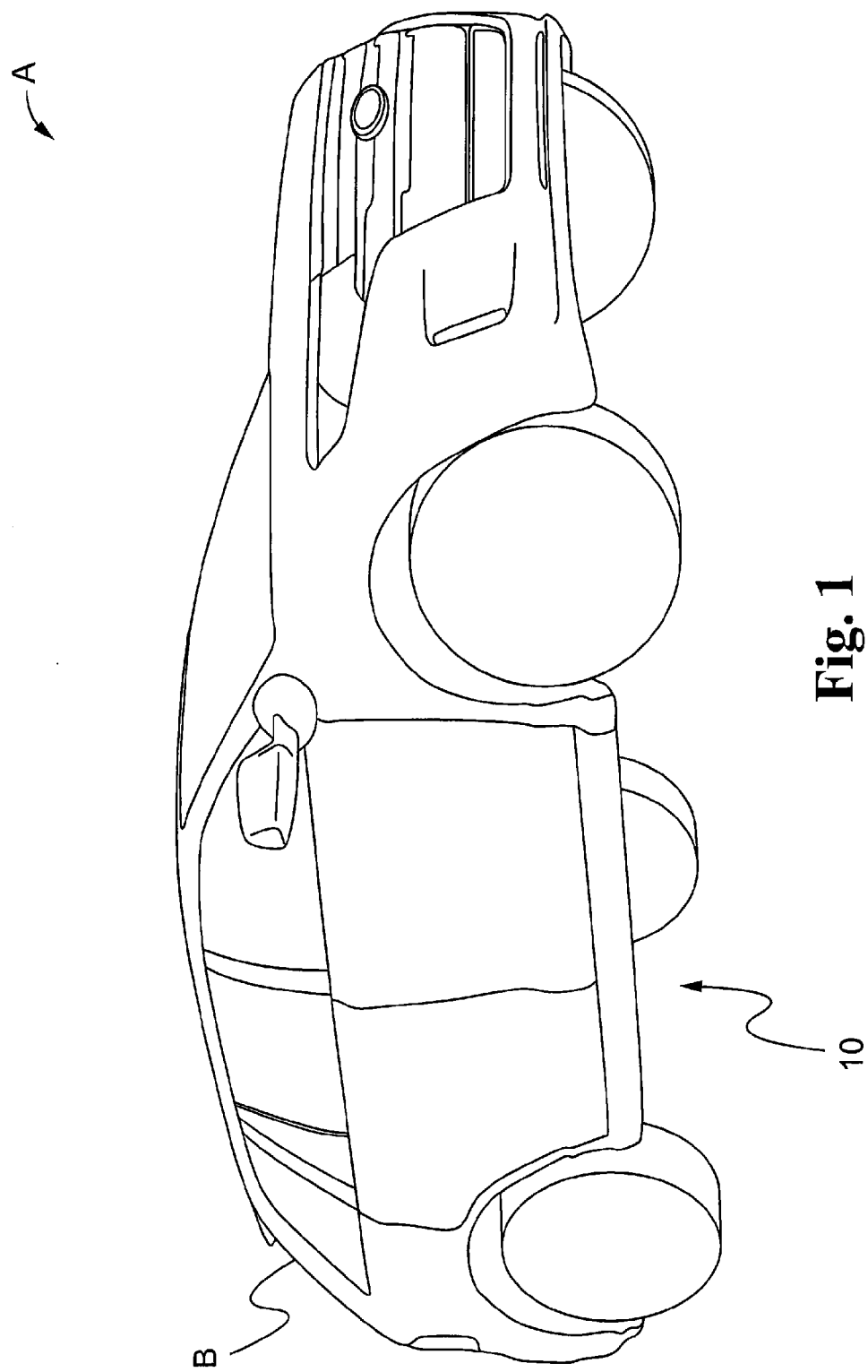
FIG. 1 is a perspective view of an automobile having installed thereon a rocker panel according to an embodiment of the invention.

Turning now to FIG. 1, shown is an assembly A including a vehicle B and a rocker panel assembly 10 mounted on vehicle B. While rocker panel assembly 10 can be configured in a range of styles, modern rocker panels generally provide vehicle B with improved aesthetics, and enhanced aerodynamic/ground effect characteristics. While the vehicle shown is a SUV, the illustration is merely exemplary as the invention will work with any type of vehicle including but not limited to cars, trucks, buses and all-terrain vehicles.

Figure 2:
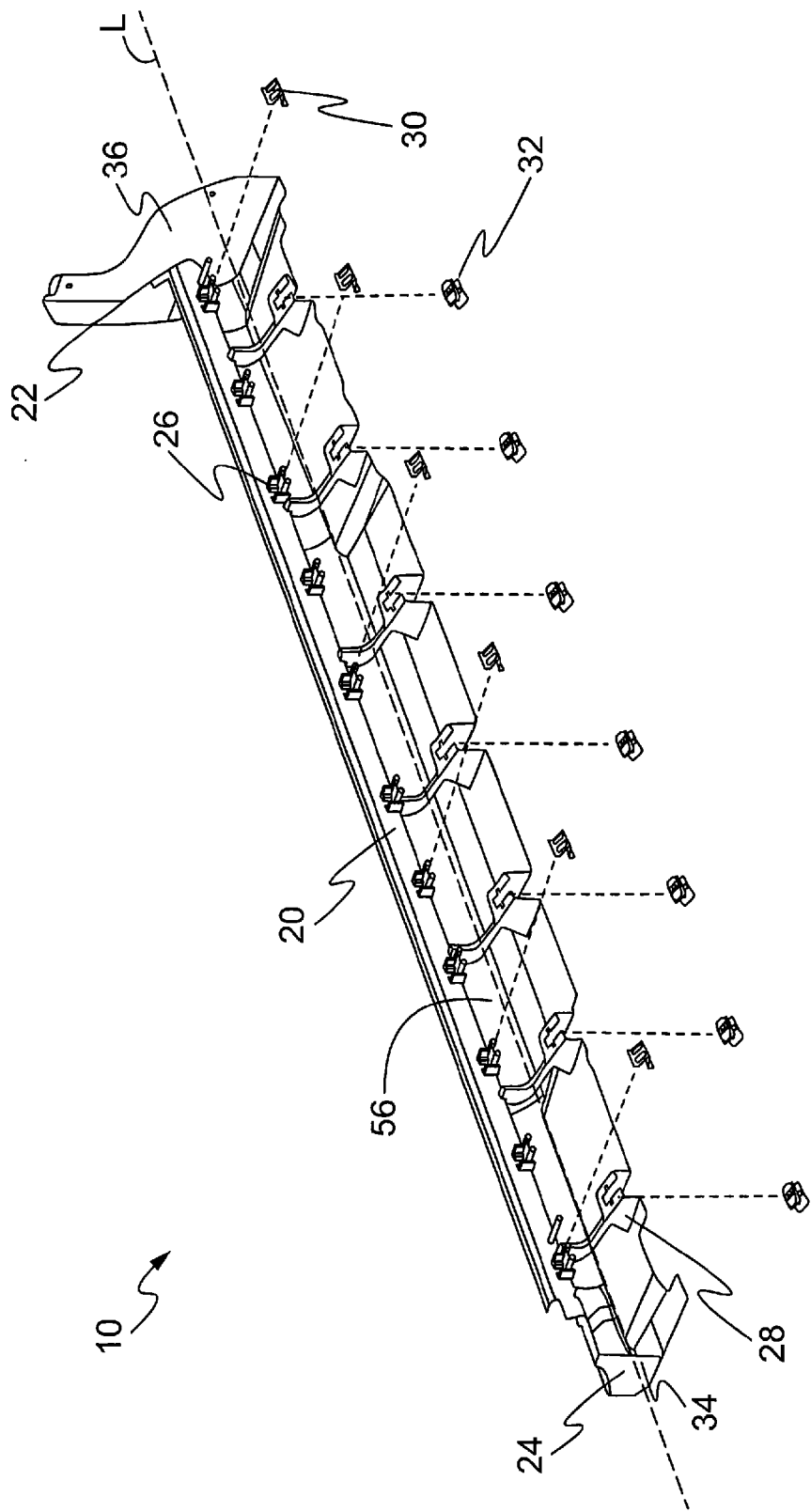
FIG. 2 is a rear perspective view of the rocker panel of FIG. 1.

From reference to FIG. 2 there is illustrated therein rocker panel assembly 10 isolated from vehicle B. The rocker panel assembly includes what will be when installed on vehicle B, a rocker panel body 20, a first end feature 22, a second end feature 24, and a plurality of mounting fixtures (e.g. clip towers 26 and fastening towers 28) for mounting rocker panel assembly 10 on vehicle B. Clip towers 26 and fastening towers 28 cooperate with suitable mounting hardware such as clips 30 and snap fasteners 32 to permit proper fit/finish and secure attachment to vehicle B. Suitable mounting hardware may include, but are not limited to clips, threaded fasteners, snap fasteners, and adhesive pads/strips. In the example shown, clips 30 are provided on alternate clip towers 26. As such, clip towers 26 vacant of clip 30 serve to align rocker panel assembly 10 on vehicle B, while clip towers 26 having clips 30 serve to provide the fastening function. In general, the clip towers and fastening towers may take on a variety of forms, with the intended purpose of providing secure attachment of rocker panel body 20 to vehicle B while also providing proper fit/finish alignment.

First and second end features 22 and 24 generally serve to prevent the ingress of water/debris into the rear area or space defined by rocker panel body 20. As such, the end features may provide a closure element 34 such as that shown on second end feature 24. Alternatively, the end feature may be stylized for aesthetic/functional purpose, for example as shown on first end feature 22 incorporating a mud deflection element 36. In general, the end features may take on a variety of forms, depending on the vehicle, and the desired aesthetic/performance characteristics. In addition, while exemplified as being integral with rocker panel body 20, the end features may be separately formed and attached to rocker panel body 20 using suitable fasteners.

Figure 3:
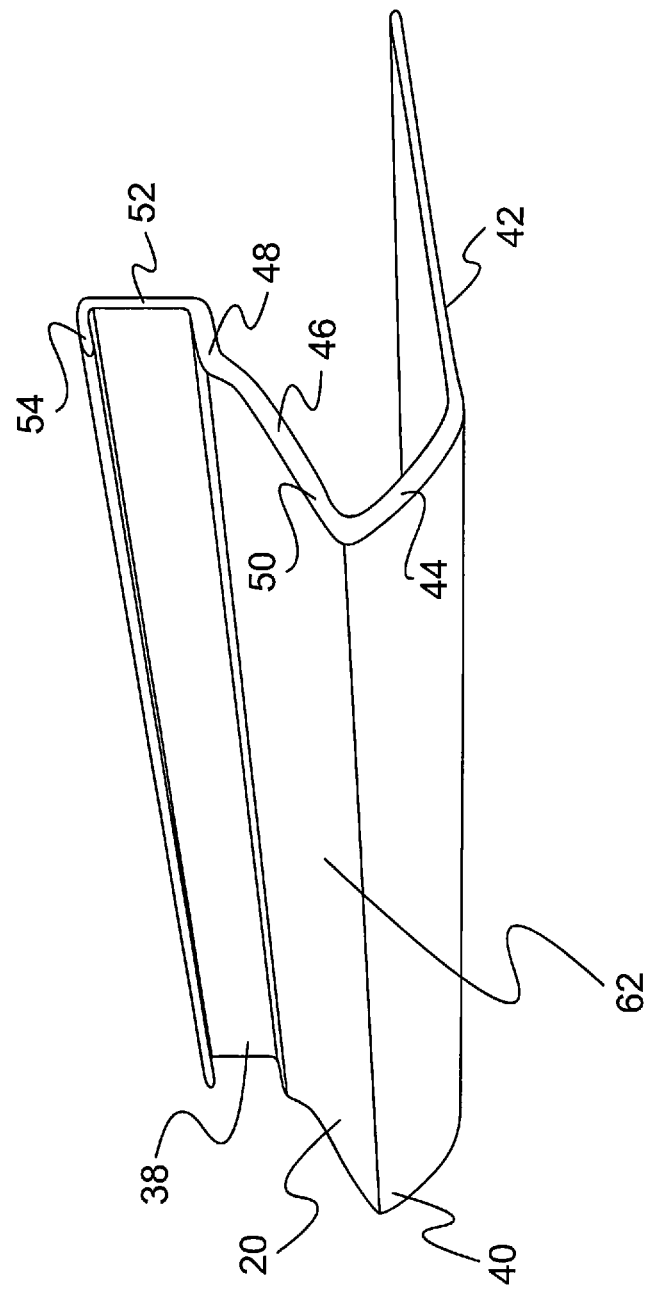
FIG. 3 is a front perspective view of a section of the rocker panel of FIG. 1.

FIG. 3 presents a front perspective view of a sectioned segment of rocker panel body 20. As detailed, rocker panel body 20, when viewed from the front has an exterior surface generally presented in a convex configuration comprising an upwardly extending door bearing section 38, an outwardly extending outboard section 40 and an underside or lower-most section 42. Viewed from the rear, rocker panel body 20 has an interior surface generally presented in a concave configuration, as it is substantially open along the rear side of body 20, generally opposite outboard section 40.

As will be appreciated, outboard section 20 is generally provided with a profile or contour that achieves the desired aerodynamic/ground effect performance characteristics. In the embodiment detailed herein, outboard section 40 in the region between lower-most section 42 and door bearing section 38 includes a first wall segment 44, a second wall segment 46 and a third wall segment 48, with first and second wall segments 44, 46 transitioning at bend 50 from an upward/outward direction to an upward/inward direction. Similarly, door bearing section 38 is provided with a profile or contour that achieves the desired performance characteristics, but generally includes an upwardly extending seal plate 52 and a top plate 54, seal and top plates 52, 54 being configured to receive a suitable door seal (not shown). Lower-most section 42 primarily provides a utilitarian function by having formed therein one or more fastening towers 28 (as shown in FIG. 2) suitable for securely fastening the lower-most section 42 of rocker panel body 20 to vehicle B using a suitable range of fasteners including but not limited to clips, threaded fasteners, snap fasteners, and adhesive pads/strips.

Figure 4B:
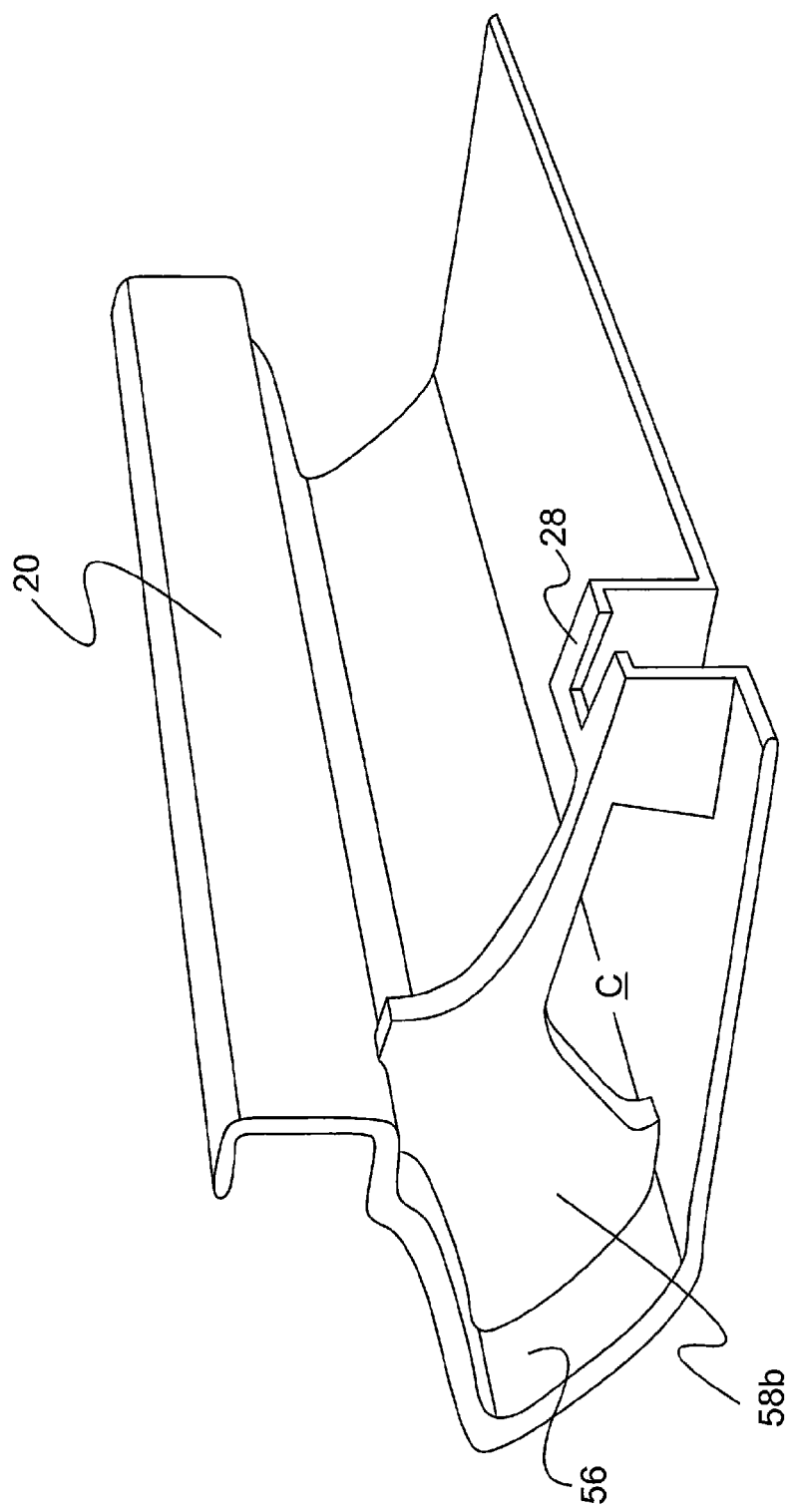
FIG. 4b is a rear perspective view of a section of the rocker panel of FIG. 1, showing the incorporation of a full transverse rib with a cutout.
Figure 4C:
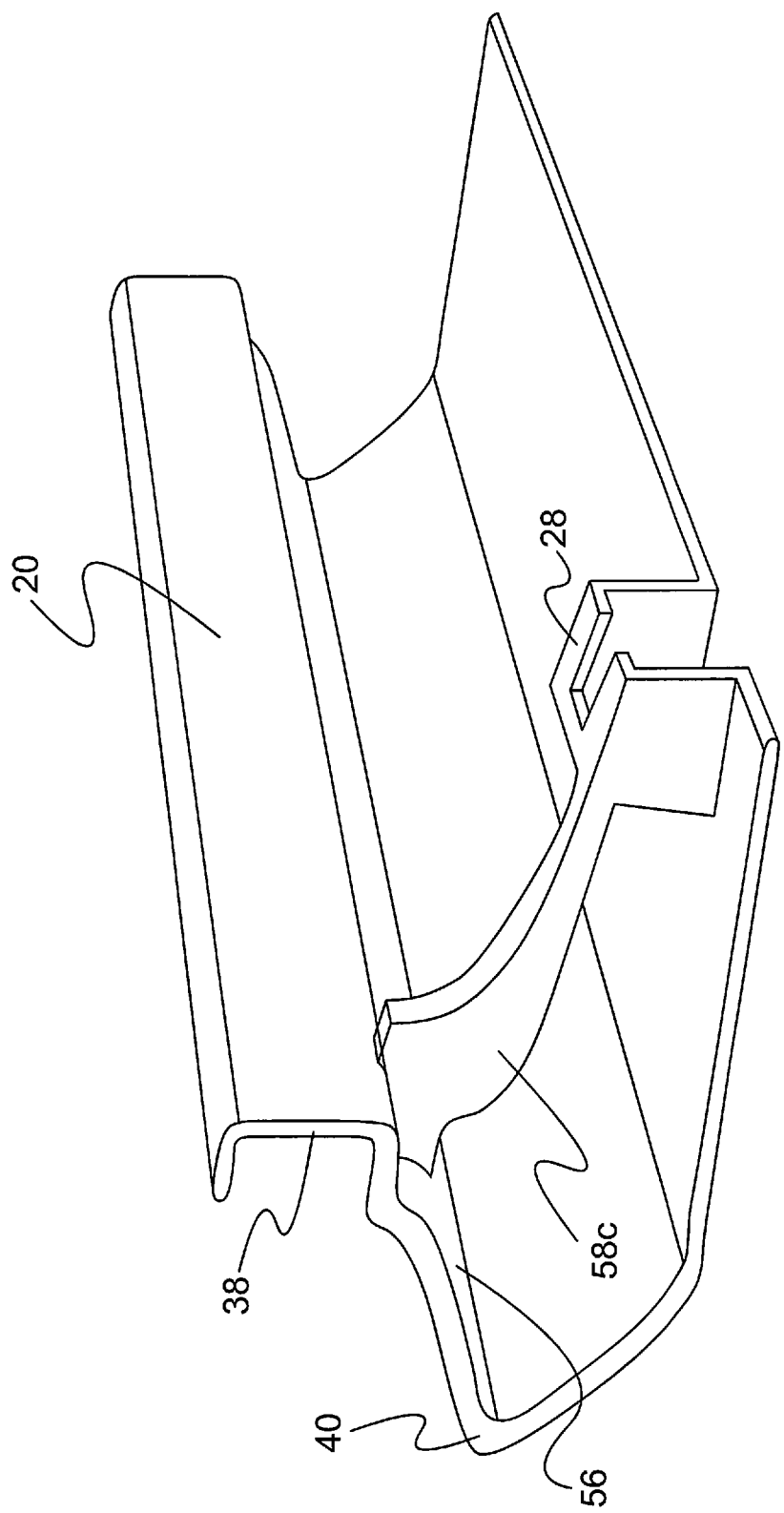
FIG. 4c is a rear perspective view of a section of the rocker panel of FIG. 1, showing the incorporation of a partial transverse rib.

Although not generally regarded as a support structure, rocker panels are preferably engineered to withstand considerable loads. For example, routinely considered during product development is the ability of the rocker panel to withstand the standing weight of a vehicle occupant. This has become a necessity in the development of modern rocker panels as current designs often have a profile that extends outwardly of the vehicle, such as the form presented here. As a result, modern rocker panels may in fact serve as a stepping surface, for example during the loading/unloading of items retained by a roof-rack system. In prior art rocker panels, a common feature was the use of one or more longitudinal ribs to provide structural rigidity under load, and/or the incorporation of structural inserts that provided the rocker panel with increased strength characteristics. In contrast to prior art rocker panels, rocker panel body 20 provides an intermittent rib arrangement where a plurality of transverse ribs are positioned in spaced-apart or intermittent relationship on the rear/inside surface 56 of rocker panel body 20. The configuration of the transverse rib may take on a variety of forms, including but not limited to a full transverse rib 58a as shown in FIG. 4a, a full transverse rib 58b having cut-out C as shown in FIG. 4b and a partial transverse rib 58c as shown in FIG. 4c. To provide added structural support, any of the above-noted transverse ribs may abut and generally be integral with fastening tower 28.

The transverse ribs 58a, 58b, 58c detailed herein are configured to be arranged generally perpendicular to the longitudinal axis L of rocker panel body 20. The full transverse ribs 58a, 58b shown in FIGS. 4a and 4b, respectively, are generally fully integral with the inside surface 56 of outboard section 40 and lower-most section 42, although the continuity of the interface/bonding between transverse rib 58a, 58b and inside surface 56 may be intermittent. The partial transverse rib 58c shown in FIG. 4c provides a light-weight alternative to the full transverse rib, and as shown is integral with the inside surface 56 of rocker panel body 20, generally where the door bearing section 38 transitions into the outboard section 40, and extends transversely to join integrally with fastening tower 28.

As noted in the sectional view of FIG. 5, the wall structure of rocker panel body 20 varies in thickness, with increased thickness provided for outboard section 40 relative to door bearing section 38 and lower-most section 42. In general, resistance to deformation under load is a function of wall thickness for a particular region of rocker panel 10. In some embodiments, the increase in thickness in the outboard section 40 relative to the door bearing section 38 and/or lower-most section 42 is in the range of 10 to 160%. For example, where lower-most section 42 is 3 mm in thickness, outboard section 40 may be anywhere up to 8 mm in thickness. In some embodiments, increases in thickness may be greater than 160%, depending on the targeted performance characteristics. Additional increased thickness of the wall structure may be provided at bend 50 so as to further enhance the resistance to deformation of the outboard section 40 under load.

Figure 6:
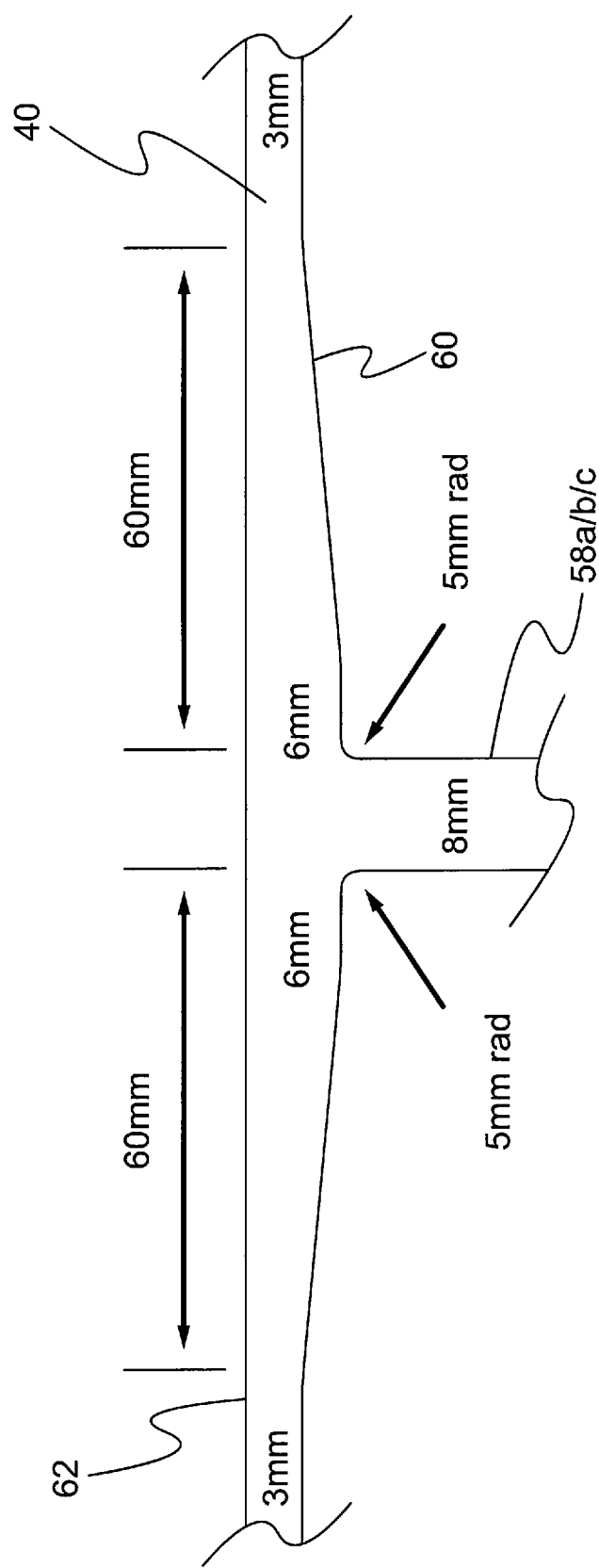
FIG. 6 is a schematic representation of the wall structure of the rocker panel, showing an increase in wall thickness of the outboard section on each side of a transverse rib.

In some embodiments, wall thickness in the region proximal the transverse ribs 58a, 58b, 58c is increased to provide additional structural rigidity. In some embodiments, the increase in thickness relative to the surrounding wall area is in the range of 10 to 160%. For example, in the schematic representation of FIG. 6, the wall structure of the outboard section 40 is increased from 3 mm to 6 mm over a 60 mm taper region extending on each side of a transverse rib 58 (*a/b/c*) having a thickness of 8 mm. As shown, the increase in thickness is provided relative to the inside surface, so as to maintain a level outside surface on rocker panel body 20.

The outside surface 62 of rocker panel body 20 is generally provided as a Class "A" surface. As used herein, a Class "A" surface is intended to refer to a surface that is visually decorative and smooth to the unaided eye or, in other words is visually free of unintentional distortions, such as sink marks, dimples, indents, divots, and the like. As is generally known in the art, unintentional distortions (e.g. sink marks) can arise on the outside surface of an article opposite a projection. As such, achieving the desired Class "A" surface has often been the overriding factor in the placement of internal structures on molded plastic articles, as opposed to optimal positioning of such structures for increased strength and rigidity.

While a range of techniques may be used to manufacture rocker panel body 20 as detailed above, to achieve the desired Class "A" surface, one exemplary suitable technique is the injection molding process disclosed in U.S. Pat. No. 7,846,533, the contents of which is herein incorporated by reference. Although not discussed in detail herein, U.S. Pat. No. 7,846,533 teaches a process for injection molding plastic articles using a molten thermoplastic plastic, a blowing agent and a pressurizable mold cavity. In the process, gas cells form within the molten plastic and through the control of venting of the pressurizing gas during the molding process, a finished molded plastic article can be achieved having a Class "A" skin surface and a foamed core, regardless of the positioning of projections on the inside surface of the molded plastic article.

Figure 7:
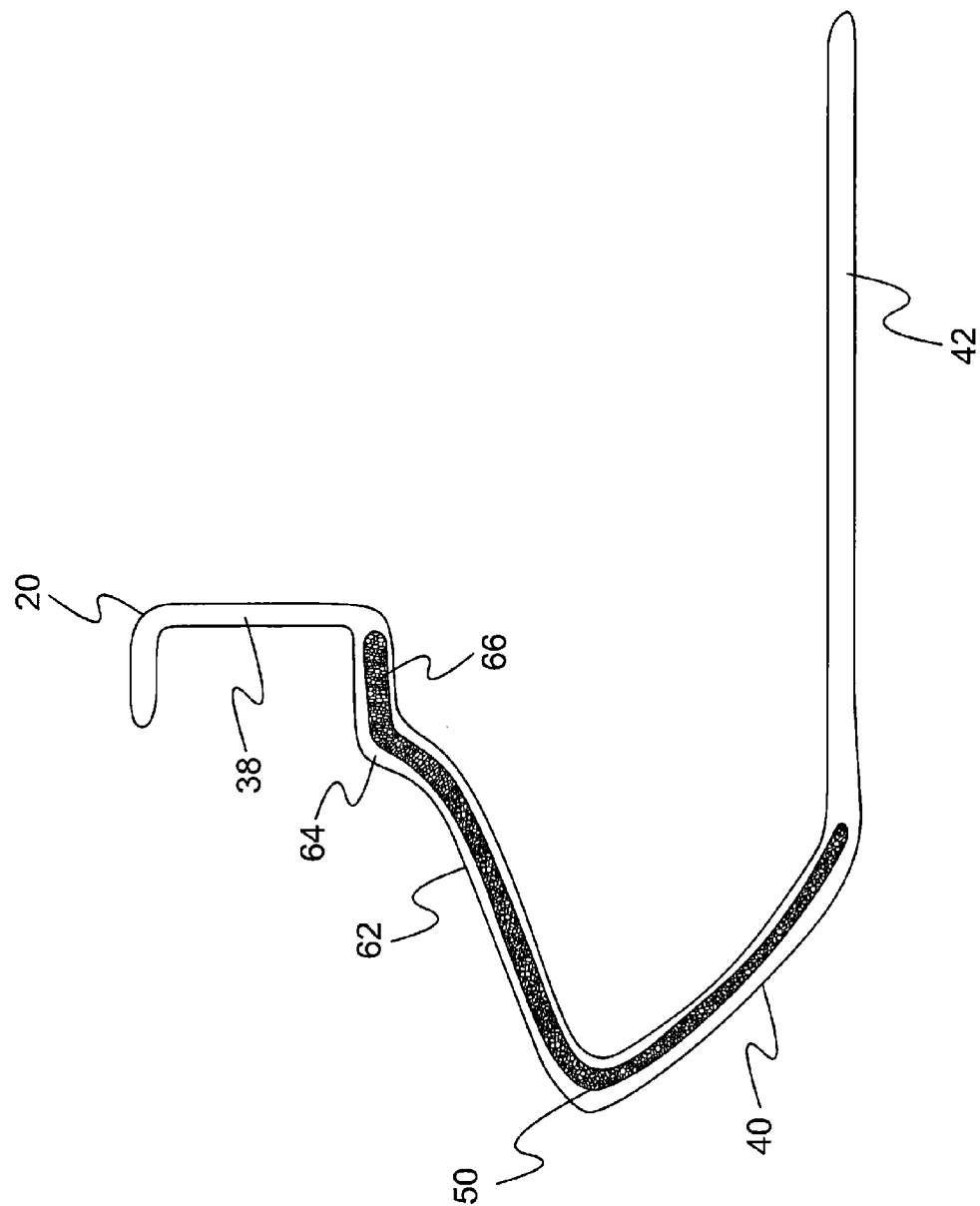
FIG. 7 is a side sectional view of an alternate embodiment of the rocker panel in which the wall structure incorporates a foamed core.

Turning now to FIG. 7, shown in cross-section is a rocker panel body 20 formed in accordance with the above-noted process. The rocker panel body 20 is once again provided with increased thickness in the outboard section 40 to provide enhanced resistance to deformation under load. Within these thickened regions of the outboard section, the skin layer 64 and the foamed core 66 are evident. As shown, the skin layer 64 has few or no gas cells contained therein, thus presenting a substantially solid layer of plastic material. The foamed core 66 comprises a plurality of gas cells, and generally exhibits a density in the region of 75% to 95% of the solid base plastic material. With the decreased plastic content in foamed core 66 in the overall plastic article, that is rocker panel body 20, an improved performance to weight ratio is achieved.

The rocker panel assembly 10, when installed on vehicle B, presents outside surface 62 of outboard section 40 as the primary visual surface. While outside surface 62 may be directly used in a rocker panel assembly 10, that is without further processing, in some embodiments, the outside surface may receive further treatments, such as, but not limited to painting and chrome plating. In some embodiments, rocker panel body 20 may receive additional structural and/or aesthetic components such as separately formed chrome plated layers/coverings.

Figure 8:
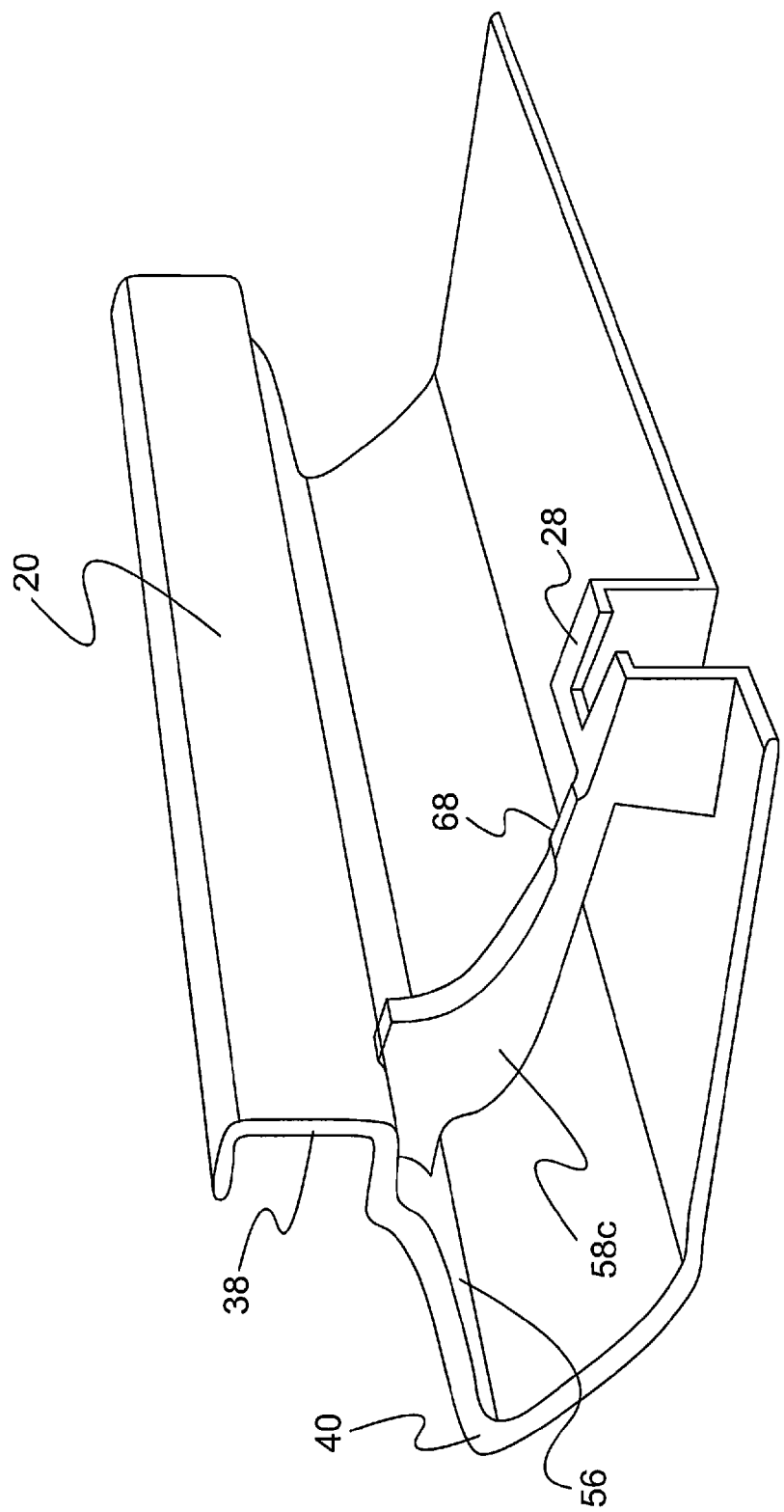
FIG. 8 is a rear perspective view of a section of the rocker panel according to a further embodiment, showing the incorporation of a partial transverse rib and anti-rotation feature.

In some embodiments, to provide additional anti-rotational characteristics on experiencing a step-load, rocker panel body 20 is provided with a raised pad 68, as shown in FIG. 8. Raised pad 68 engages the vehicle structure to provide additional anti-rotational strength about the mounting fixtures, in particular clip towers 26.

While any thermoplastic which is capable of being injection molded may be used for the rocker panel body 20, the selected thermoplastic should have the appropriate behaviour and quality to achieve the desired aesthetic and performance characteristics. Exemplary suitable thermoplastic materials include polypropylene, thermoplastic polyolefins (TPO), acrylonitrate-butadiene-styrene (ABS), polycarbonate (PC), polybutadiene terephthalate (PBT), polyethylene terephthalate (PET), nylon, polyvinyl chloride (PVC), polystyrene (PS), polyethylene (PPE), and blends of the above materials with other suitable materials (e.g. fillers including, but not limited to glass fibres, talk, etc.). Where the rocker panel body 20 is subject to additional processing steps, for example chrome plating, a compatible thermoplastic may be selected, such as but not limited to ABS.

A rocker panel assembly manufactured in accordance with the above-described technology has numerous advantages over prior art multi-piece designs including:

a. Capable of withstanding two simultaneous step loads of 200 lbs. Prior designs needed to have multiple pieces to accomplish this.

b. Lower cost to manufacture than multiple piece prior art designs.

c. Significantly less tooling is required during manufacture as compared to multi-piece prior art designs.

d. Assembly is simplified as compared to multi-piece prior art designs.

e. Installation possible at customer assembly plant. Previous multi-piece version had to be installed at an off-site modification center.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-descried exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A rocker panel assembly for attachment to a vehicle, the rocker panel assembly comprising:
    a rocker panel body;
    a first end feature situated on a first end of said rocker panel body;
    a second end feature situated on a second end of said rocker panel body;
    said rocked panel body having an outside surface generally presented in the form of a convex surface, and an inside surface generally presented in the form of a concave surface;
    said outside surface extending outwardly of said vehicle, to present an outboard section having a predetermined profile based on targeted aesthetic/performance characteristics;
    said inside surface having at least one transverse rib positioned therein, said transverse rib being arranged generally perpendicular to the longitudinal axis L of said rocker panel body;
    wherein said transverse rib is integral with the inside surface of said rocker panel body; and
    wherein said rocker panel body comprises a wall structure having increased thickness in the region proximal said transverse rib.

2. The rocker panel assembly according to claim 1, wherein said increased thickness of said wall structure of said rocker panel body increases by up to 100% in the region proximal said transverse rib.

3. The rocker panel assembly according to claim 1, wherein said increased thickness of said wall structure is provided in the form of a taper.

4. The rocker panel assembly according to claim 1, wherein said rocker panel body and said first and second end features are injection molded.

5. The rocker panel assembly according to claim 1, wherein said rocker panel body and said first and second end features are made of polypropylene.

6. The rocker panel assembly according to claim 1, wherein at least one of said rocker panel body and said first and second end features is a Class "A" surface.

7. The rocker panel assembly according to claim 1, further comprising a plurality of mounting fixtures for mounting rocker panel assembly to a vehicle.

8. The rocker panel assembly according to claim 1, wherein said first and second end features are integral with said rocker panel body.

9. The rocker panel assembly according to claim 1, wherein said first and second end features are separately formed and subsequently attached to said rocker panel body using suitable fasteners.

10. The rocker panel assembly according to claim 1, wherein said rocker panel body comprises an upwardly extending door bearing section, and a lower-most section.

11. The rocker panel assembly according to claim 1, wherein said transverse rib is a full transverse rib.

12. The rocker panel assembly according to claim 1, wherein said transverse rib is a full transverse rib having a cut-out section.

13. The rocker panel assembly according to claim 1, wherein said transverse rib is a partial transverse rib.

14. The rocker panel assembly according to claim 1, wherein said transverse rib extends transversely to join integrally with one of said mounting fixtures.

15. The rocker panel assembly according to claim 10, wherein said outboard section is provided with increased thickness relative to at least one of said door bearing section and said lower-most section.

16. The rocker panel assembly according to claim 15, wherein said outboard section comprises a foamed core.

\* \* \* \* \*